United States Patent
Nakajima et al.

(10) Patent No.: US 7,685,681 B2
(45) Date of Patent: Mar. 30, 2010

(54) ELECTRONIC APPARATUS

(75) Inventors: Yuji Nakajima, Tokyo (JP); Yosuke Miura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 11/810,713

(22) Filed: Jun. 6, 2007

(65) Prior Publication Data

US 2007/0285883 A1 Dec. 13, 2007

(30) Foreign Application Priority Data

Jun. 7, 2006 (JP) .......................... P2006-158816

(51) Int. Cl.
*E05D 3/10* (2006.01)
(52) U.S. Cl. .................... 16/367; 361/679.27
(58) Field of Classification Search .................. 16/367, 16/385, 250, 251; 361/681, 682, 683, 679.06, 361/679.28, 679.07, 679.09; 379/433.11, 379/433.12, 433.13
See application file for complete search history.

(56) References Cited

U.S. PATENT DOCUMENTS

| | | | | |
|---|---|---|---|---|
| 5,173,837 A | * | 12/1992 | Blackwell et al. | 361/679.28 |
| 5,237,488 A | * | 8/1993 | Moser et al. | 361/679.28 |
| 5,379,183 A | * | 1/1995 | Okonsky et al. | 361/679.09 |
| 5,917,968 A | * | 6/1999 | Wood | 385/15 |
| 6,359,776 B2 | * | 3/2002 | Carlson | 361/679.28 |
| 7,123,472 B2 | * | 10/2006 | Huang et al. | 361/679.09 |
| 2004/0083577 A1 | * | 5/2004 | Lu et al. | 16/367 |
| 2005/0198780 A1 | * | 9/2005 | Liu et al. | 16/367 |
| 2007/0283531 A1 | * | 12/2007 | Nakajima et al. | 16/239 |

FOREIGN PATENT DOCUMENTS

JP 2004-197862 7/2004

* cited by examiner

*Primary Examiner*—Victor Batson
*Assistant Examiner*—Michael Lee
(74) *Attorney, Agent, or Firm*—Blakely, Sokoloff, Taylor & Zafman LLP (57) ABSTRACT

According to an aspect of the present invention, an electronic apparatus includes: a main body that has an input unit placed on a top surface of the main body; a display panel that has a display surface and a rear surface on an opposite side to the display surface; a hinge mechanism that joins the display panel to the main body, the hinge mechanism having a pivot shaft, a rotation shaft, and a pivot support member; an engagement part that is provided on the pivot support member; and a reception part that receives the engagement part. The reception part is provided on the main body, wherein the pivot shaft pivotably supports the display panel. The rotation shaft rotatably supports the display panel to be openable about an axis provided along one side of the display panel, and the pivot support member supports the pivot shaft and the rotation shaft.

4 Claims, 10 Drawing Sheets

ELECTRONIC APPARATUS

CROSS-REFERENCE TO RELATED APPLICATIONS

This application is based upon and claims the benefit of priority from Japanese Patent Application No. 2006-158816, filed Jun. 7, 2006, the entire contents of which are incorporated herein by reference.

BACKGROUND

1. Field

One embodiment of the invention relates to an electronic apparatus including a hinge mechanism for enabling the user to turn a display panel between a state in which a display surface is turned down relative to a main body and a state in which the display surface is put on the main body as it is turned up.

2. Description of the Related Art

A portable electronic apparatus including a hinge mechanism for joining a display panel rotatably to a main body with two axes crossing vertically at the center exists. In such an electronic apparatus, a cable wired between the main body and the display panel is allowed to pass through the inside of the hinge mechanism or the surrounding thereof. Therefore, the rotation angle of the display panel relative to the main body needs to be limited.

An electronic apparatus described in JP-A-2004-197862 includes a raising shaft for moving and rotating a display panel put on a main body in a direction raising the display panel and a reversal shaft for reversing the display panel raised by the raising shaft. A hinge device for limiting the rotation angle is applied to the reversal shaft and includes an over-rotation blocking mechanism. The over-rotation blocking mechanism includes a rotation member, a first abutment holding mechanism, and a second abutment holding mechanism. If the display panel is rotated in any direction, the rotation member is sandwiched between the first abutment holding mechanism and the second abutment holding mechanism. This structure enables the display to be rotated 180 degrees in any direction.

However, the over-rotation blocking mechanism is built in the hinge device described in JP-A-2004-197862. Therefore, to reverse the display panel, whether or not the display panel can be more rotated cannot be determined from the appearance. To reverse the display panel, the user takes hold of the outer peripheral portion of the display panel and operates it.

Therefore, if the electronic apparatus has a small display panel like a mobile telephone, when the display panel is over-rotated, the rotation torque applied to a hinge device is small and thus the hinge device is not broken. However, if the electronic apparatus has a large display panel like a notebook computer, when the display panel is over-rotated, the rotation torque applied to a hinge device is large in proportion to the size of the display panel and thus the hinge device may be broken.

DETAILED DESCRIPTION

Various embodiments according to the invention will be described hereinafter with reference to the accompanying drawings. In general, according to one embodiment of the invention, an electronic apparatus comprises: a main body that has an input unit placed on a top surface of the main body; a display panel that has a display surface and a rear surface on an opposite side to the display surface; a hinge mechanism that joins the display panel to the main body, the hinge mechanism having a pivot shaft, a rotation shaft, and a pivot support member; an engagement part that is provided on the pivot support member; and a reception part that receives the engagement part when the display surface faces the input unit or when the rear surface faces the input unit, the reception part being provided on the main body, wherein the pivot shaft pivotably supports the display panel with an axis rising from the top surface of the main body, the rotation shaft rotatably supports the display panel to be openable about an axis provided along one side of the display panel, and the pivot support member supports the pivot shaft and the rotation shaft in a state in which the pivot shaft and the rotation shaft intersect with one another, the pivot support member being providable about the pivot shaft.

An electronic apparatus 1 of one embodiment according to the invention will be discussed with reference to FIGS. 1 to 10 by taking a notebook computer as an example. The electronic apparatus 1 shown in FIG. 1 includes a main body 2, a display panel 3, a hinge mechanism 4, an engagement part 5, and reception parts 6. The display panel 3 can be turned from a state in which the display panel 3 is put on the main body 2 with one face turned down to a state in which the display panel 3 is put on the main body 2 with one face turned up. For convenience in the embodiment, the right, left, and the front viewed from the user side in a state in which the main body 2 is set on a table, etc., are defined as front, the depth is defined as rear (back), and upward and downward are defined in the vertical direction.

The main body 2 has a housing 20 forming a shell and contains a circuit board on which a CPU, etc., is installed, a storage medium, and the like. A keyboard 8 as an example of an input unit is included on the top surface of the housing 20. The display panel 3 contains a liquid crystal display 31 and a digitizer 32. The liquid crystal display 31 is an example of a display and provides a display surface 31a of the display panel 3 as a display section. The liquid crystal display 31 may be a plasma display, an organic electroluminescence, a surface conduction type electron emission element display, etc.

The digitizer 32 is an example of an input unit for enabling the user to perform entry operation in association with the image displayed on the display section of the liquid crystal display 31. A touch panel may be deposited on the display section of the liquid crystal display 31 in place of the digitizer 32. The display panel 3 on the opposite side to the display surface 31a facing the display section is a rear 31b.

Figure 4:
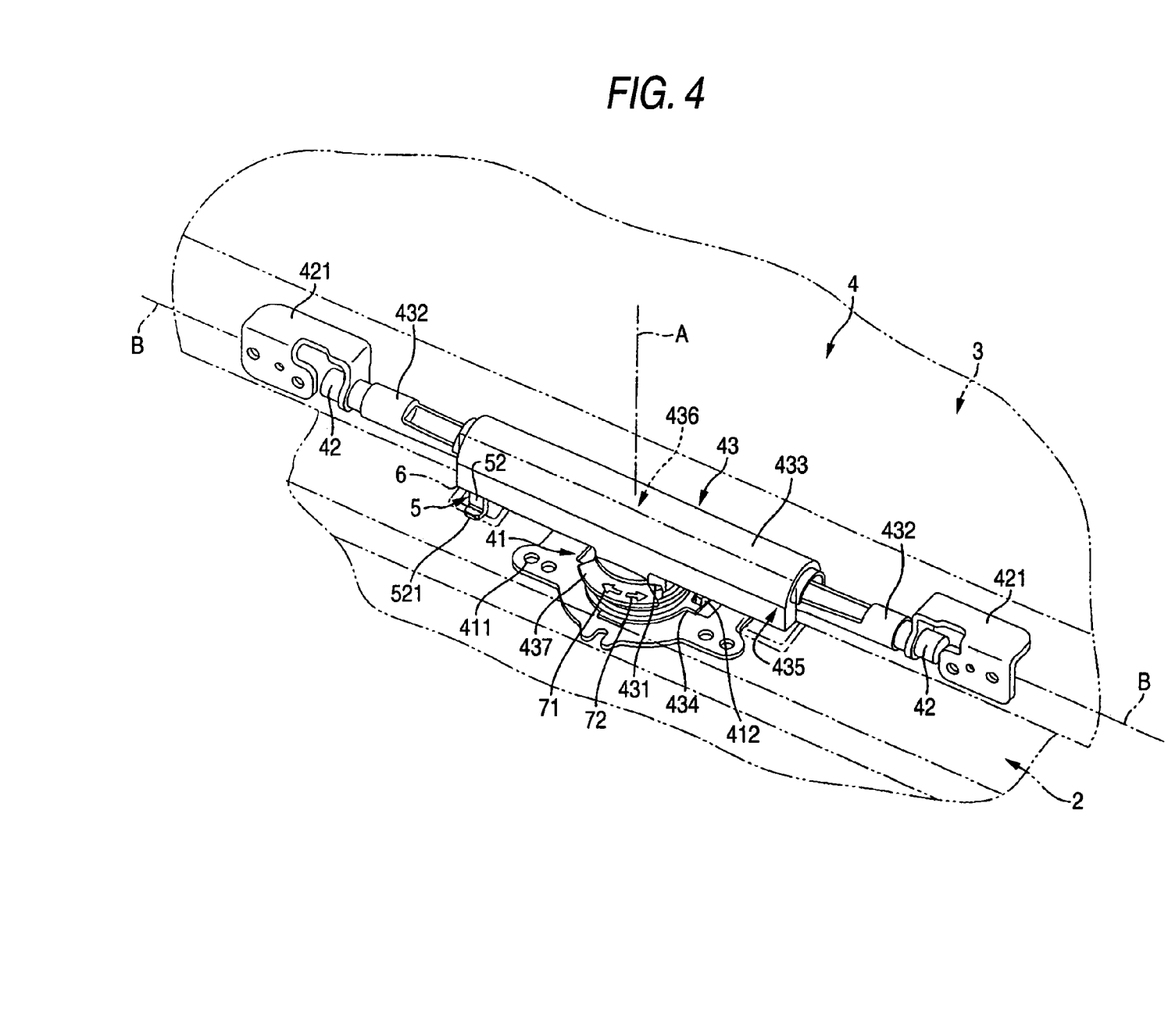
FIG. 4 is an exemplary perspective view of the hinge mechanism of the electronic apparatus shown in FIG. 1.
Figure 5:
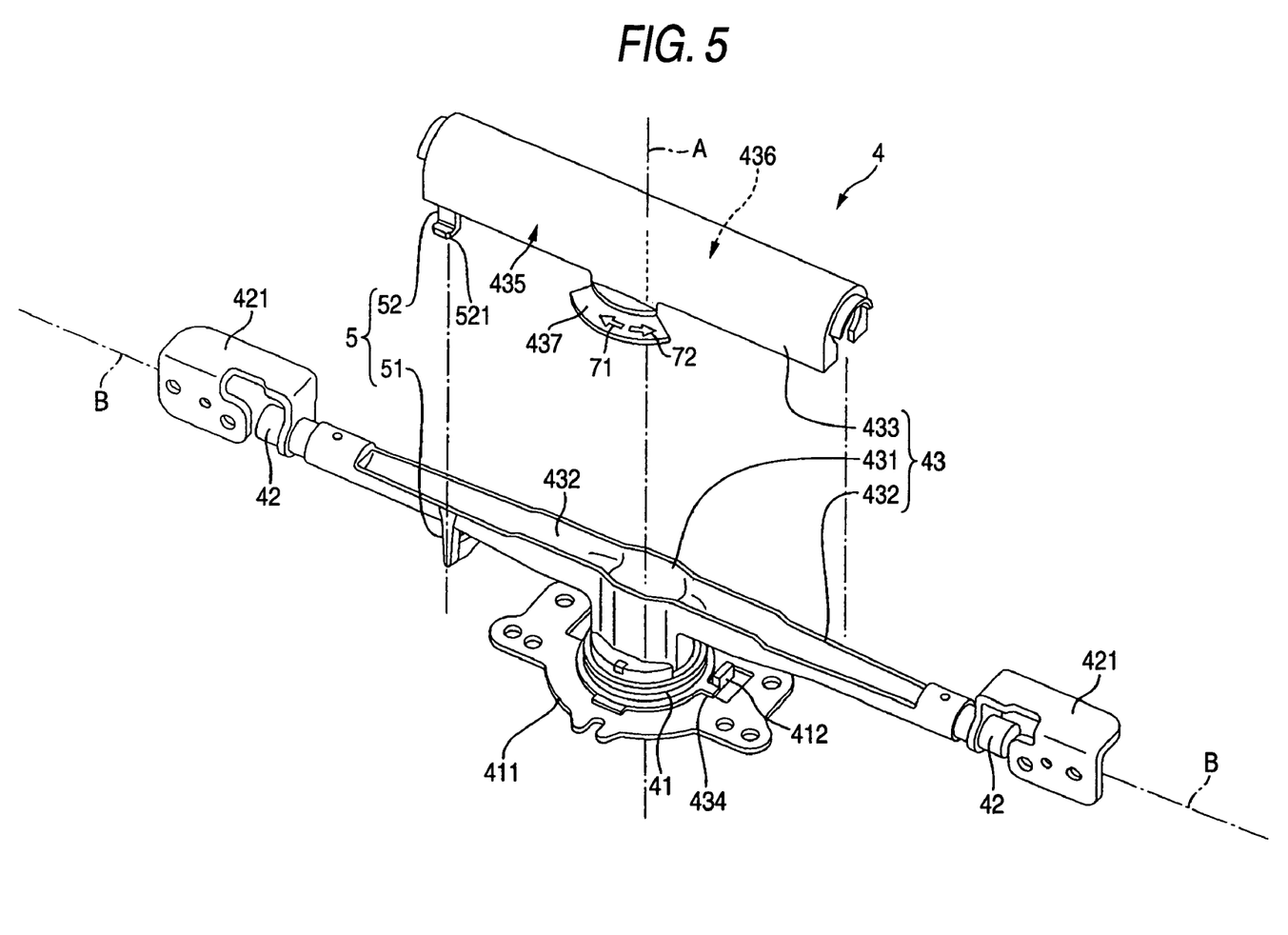
FIG. 5 is an exemplary exploded perspective view of the hinge mechanism shown in FIG. 4.

The hinge mechanism 4 has a pivot shaft 41, rotation shafts 42, and a pivot support member 43 as shown in FIGS. 4 and 5 and joins the main body 2 and the display panel 3. The pivot shaft 41 is placed at a center position in the width direction to the back of the main body 2 and pivotably supports the display panel 3 with an axis A extending in a rising direction from the upper face of the main body 2 as the center. A base plate 411 for coupling with the main body 2 is attached to the lower end of the pivot shaft 41. The base plate 411 has a stopper 412 for limiting the rotation angle of the pivot support member 43 with the pivot shaft 41 as the center.

Each rotation shaft 42 rotatably supports the display panel 3 with an axis B as the center in a direction raising the display panel 3 relative to the main body 2 from a state in which the display panel 3 is put on the main body 2. The rotation shaft 42 has a rotation friction resistance sufficient for holding the display panel 3 in the attitude at any desired rotation position. The axis B is placed along one side of the back of the display panel 3 put on the main body 2. The rotation shaft 42 has an arm 421 extending in the radial direction from the axis B. The arm 421 is fixed to the inside of the display panel 3.

The pivot support member 43 includes a body part 431, an arm part 432, and a hinge cover 433. The body part 431 is joined in the lower part to the pivot shaft 41. The body part 431 is formed like a tube along the axis A of the pivot shaft 41 and has a securing piece 434 extending in the radial direction of the axis A from the lower end. If the display panel 3 is rotated with the pivot shaft 41 as the center, the securing piece 434 abuts the stopper 412 at a position where the display surface 31a is directed toward the front as the keyboard 8 side or a position where the back of the display surface 31a is to the keyboard 8 side, namely, a position where the display surface 31a is directed backward and the rear 31b is directed to the keyboard 8.

The arm part 432 extends along the axis B from the upper surface of the body part 431 and forms the shape of a letter T together with the body part 431. The rotation shafts 42 are attached to end parts of the arm part 432 and the arm part 432 between the rotation shafts 42 is opened upward so that it is hollowed out along the axis B. A cable extending from the circuit board in the main body 2 and connected to the liquid crystal display 31 and the digitizer 32 is passed through the insides of the body part 431 and the arm part 432.

Figure 1:
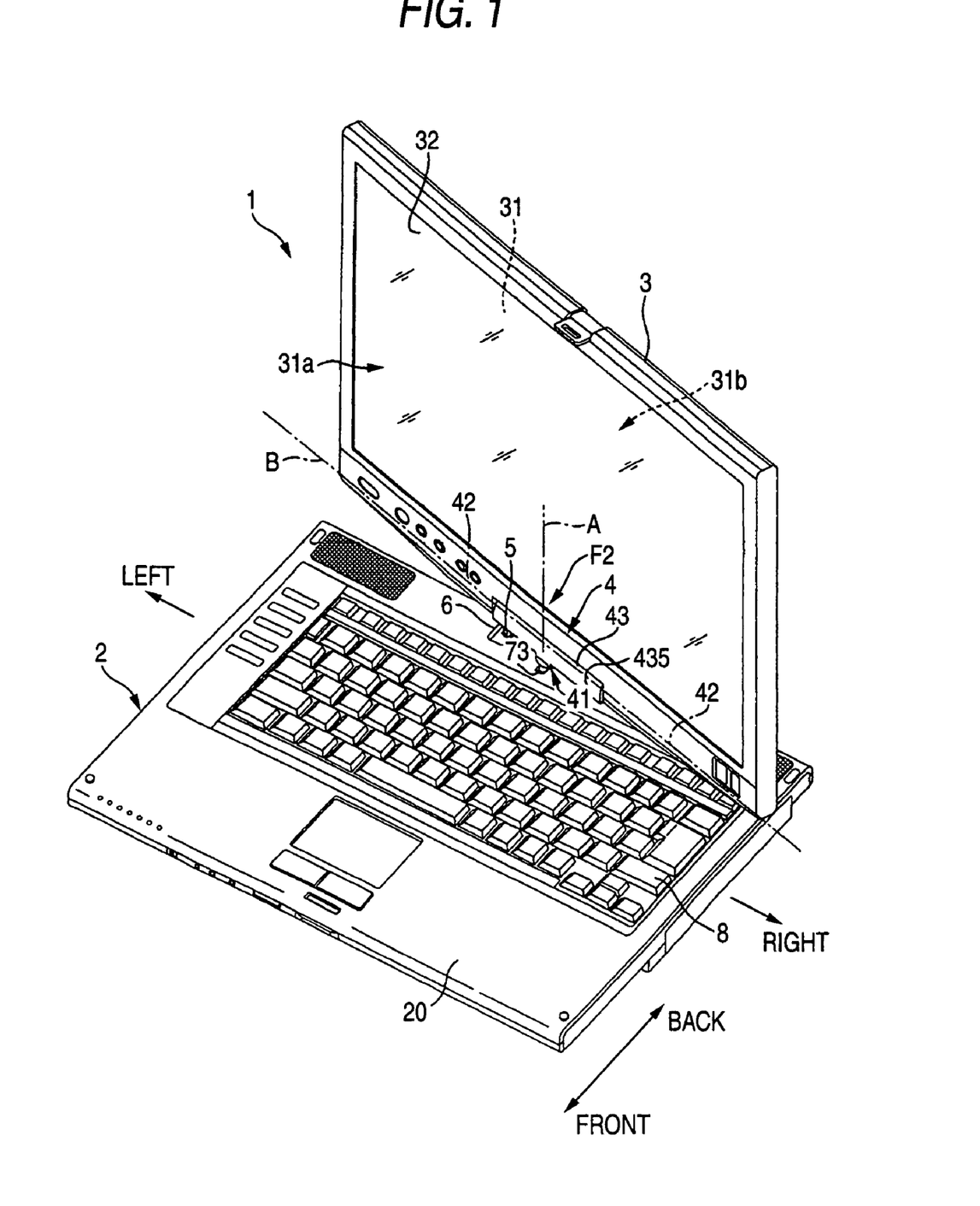
FIG. 1 is an exemplary perspective view to show an electronic apparatus of one embodiment according to the invention.
Figure 2:
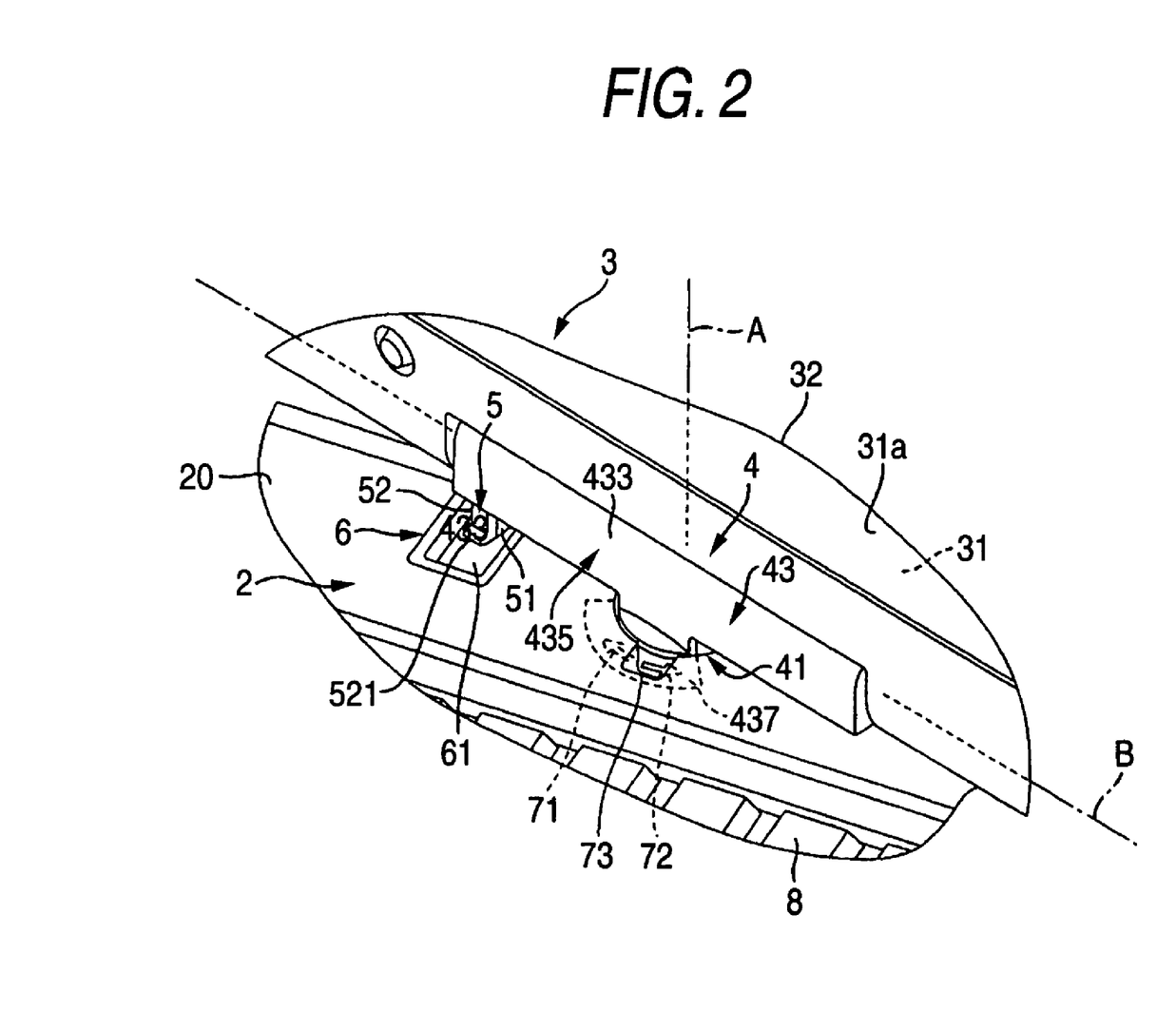
FIG. 2 is an exemplary perspective view, on an enlarged scale, of the periphery of a hinge mechanism indicated by an F2 arrow in FIG. 1.
Figure 3:
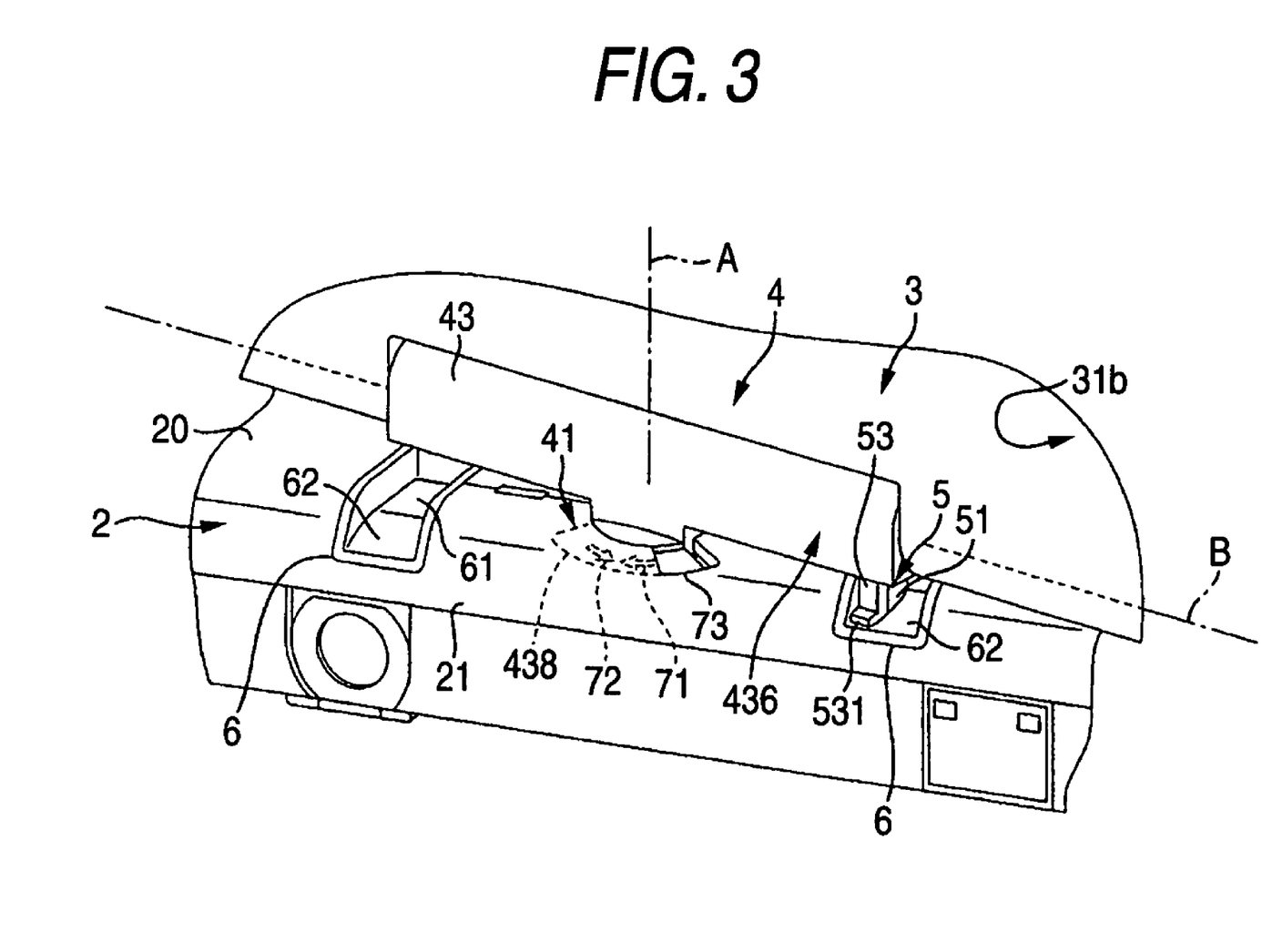
FIG. 3 is an exemplary perspective view of the periphery of the hinge mechanism of the electronic apparatus shown in FIG. 1 from the rear of a main body.

The hinge cover 433 is formed like a saddle so as to cover the body part 431 and the arm part 432 of the pivot support member 43 from the above. In a state in which the hinge mechanism 4 is assembled, a skirt part 437 hanging to an operation face side 435 facing the display surface 31a and a skirt part 438 hanging to a non-operation face side 436 on the opposite side thereto are embedded in the main body 2 as shown in FIGS. 2 and 3. The housing 20 of the main body 2 has a cover 21 for covering the skirt parts 437 and 438 of the hinge cover 433 flush with the top surface of the main body 2 after the hinge mechanism 4 is built in the main body 2.

Figure 7:
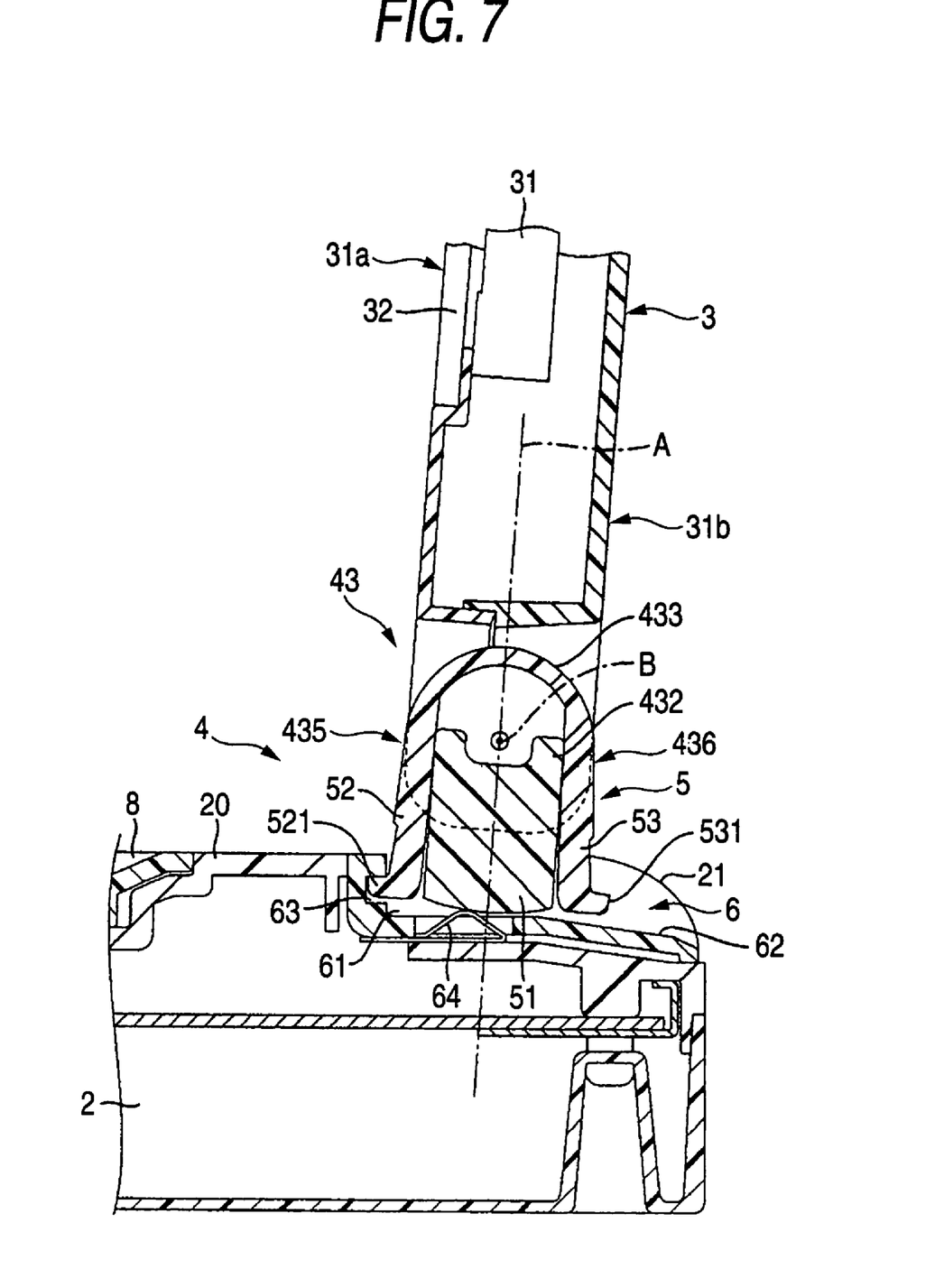
FIG. 7 is an exemplary sectional view of an engagement part and a reception part taken on line F7-F7 in FIG. 6.
Figure 8:
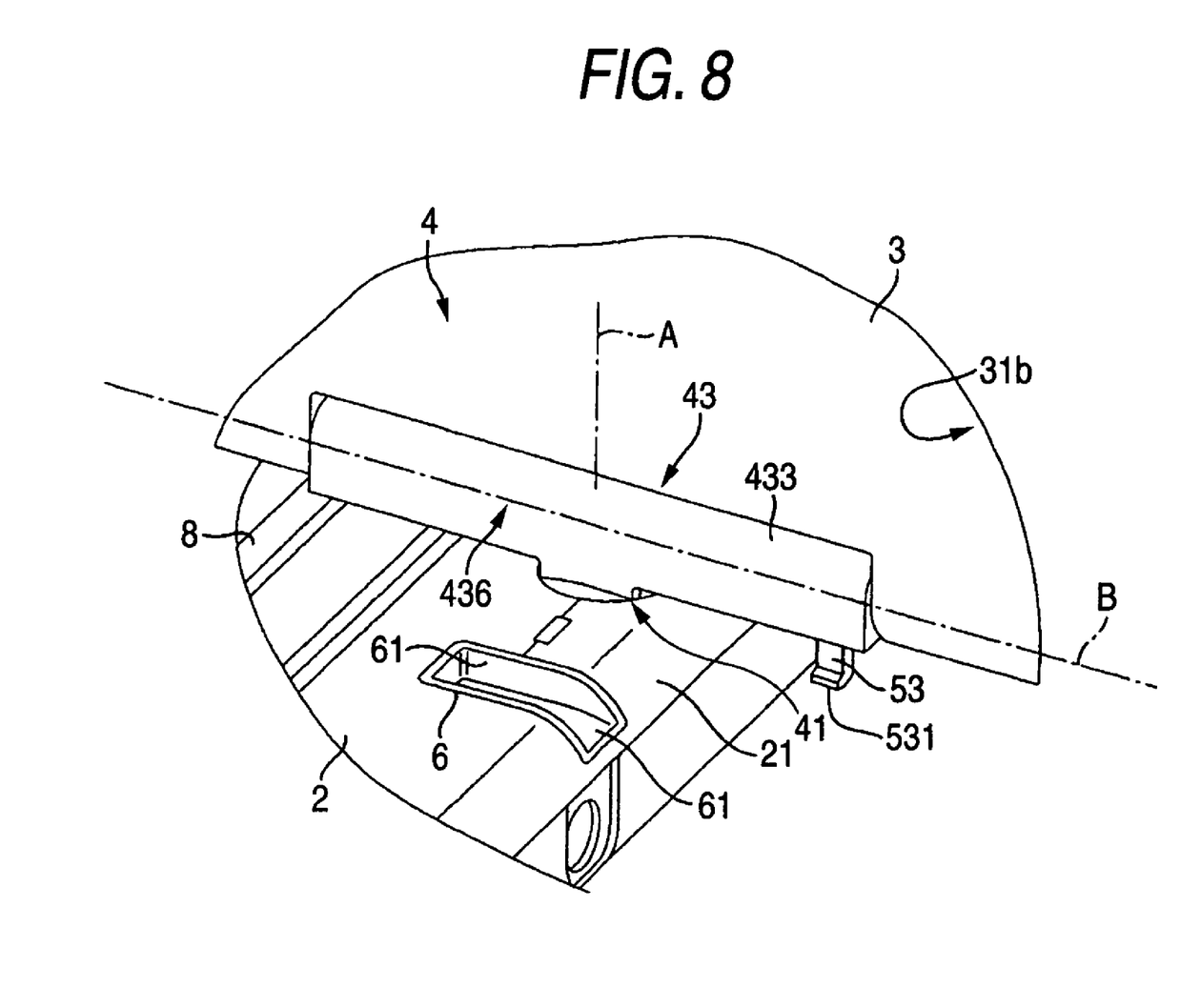
FIG. 8 is an exemplary perspective view, on an enlarged scale, of the periphery of the hinge mechanism in a state in which the display panel is rotated about 90° with a pivot shaft as the center from the state shown in FIG. 6.

The engagement part 5 is placed at midpoint in the arm part 432 at a distant position in the axial direction from the pivot shaft 41 along the axis B of the rotation shafts 42 and extends to a length to such an extent interfering with the main body 2 in the parallel direction with the axis A, namely, in the direction toward the main body 2, as shown in FIG. 4. The engagement part 5 is made up of a core 51 molded integral with the body part 431 and the arm part 432 of the pivot support member 43 and leg parts 52 and 53 extending integrally from the operation face side 435 and the non-operation face side 436 of the hinge cover 433, as shown in FIGS. 5 and 7.

The core 51 is molded integrally using a member having electric conductivity with the body part 431 and the arm part 432, for example, an alloy of aluminum and zinc. The leg part 52 of the operation face side 435 and the leg part 53 of the non-operation face side 436 have projections 521 and 531, respectively, projecting toward the pivoting direction with the pivot shaft 41 as the center.

The reception parts 6 are recessed from the upper face of the main body 2 and are placed at positions receiving the engagement part 5 in a state in which the display surface 31a is opposed to the keyboard 8 and a state in which the rear 31b of the display panel 3 on the opposite side to the side where the display surface 31a is provided is opposed to the keyboard 8. Specifically, the reception parts 6 are provided on the right and the left with the pivot shaft 41 as the center viewed from the user side. Each reception part 6 has a pocket into which the engagement part 5 is fitted and an approach 62 for allowing the engagement part 5 to enter the pocket 61 from the back.

The approach 62 is inclined so that the engagement part 5 runs up toward the pocket 61. The pocket 61 has a fit recess part 63 into which the projection 521, 531 provided on the leg part 52, 53 is fitted and a ground terminal 64 exposed upward. The terminal 64 comes in contact with the tip of the core 51 of the engagement part 5 housed in the reception part 6. The core 51 is electrically connected to ground of parts provided in the display panel 3 through the arm part 432, the rotation shaft 42, and the arm 421.

As the core 51 comes in contact with the terminal 64, the parts in the display panel 3 can be installed effectively. The terminal 64 may not only be exposed from the bottom of the pocket 61 as in the embodiment, but also be placed at a position where it is electrically connected to the core 51 of the engagement part 5 fitted into the reception part 6. Therefore, the terminal 64 may be provided so as to be exposed from any plane if it is placed inside the reception part 6.

Thus, the engagement part 5 mounts on the reception part 6, so that inclining of the display panel 3 in the in-plane direction along the display surface 31a in the direction in which the side where the engagement part 5 is provided approaches the main body 2 can be suppressed. Further, the projection 521, 531 is included at the end part of the engagement part 5 and is fitted into the reception part 6, so that inclining of the display panel 3 in the in-plane direction along the display surface 31a in the direction in which the side of the engagement part 5 is away from the main body 2 can be also suppressed.

Figure 6:
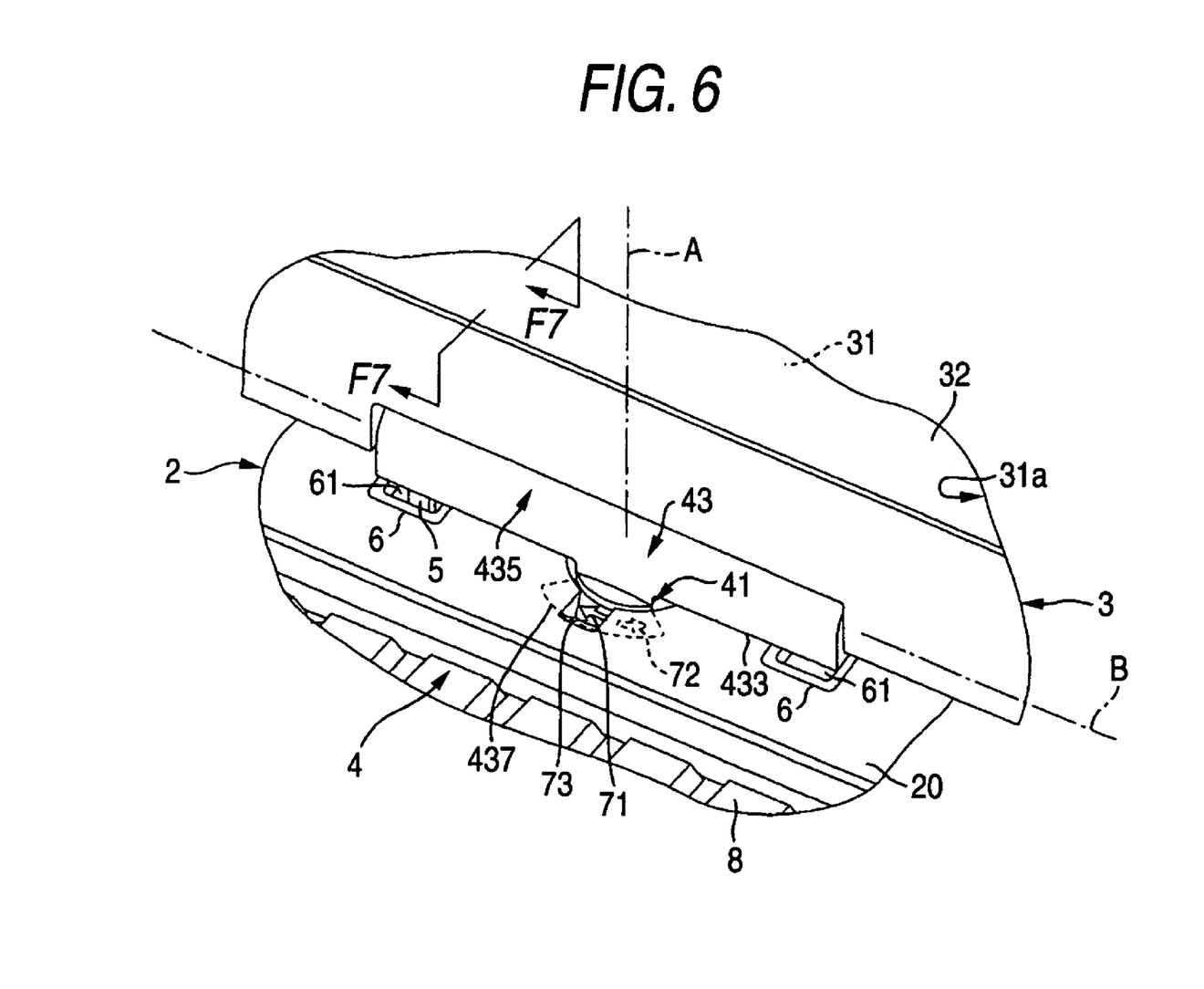
FIG. 6 is an exemplary perspective view, on an enlarged scale, of the periphery of the hinge mechanism in a state in which a display surface of a display panel of the electronic apparatus shown in FIG. 1 is opposed to a keyboard.

A first index 71 and a second index 72 for indicating the direction in which the pivot support member 43 can be rotated relative to the base plate 411 are displayed on the skirt parts 437 and 438. The first index 71 indicates a first pivot direction of the display panel 3 with the pivot shaft 41 as the center by an arrow, in the embodiment, the direction in which the display surface 31a is directed to the left viewed from the side of the display surface 31a by an arrow as shown in FIGS. 2, 3, and 6. The second index 72 indicates a second pivot direction opposite to the first pivot direction, in the embodiment, the direction in which the display surface 31a is directed to the right viewed from the side of the display surface 31a by an arrow.

Figure 9:
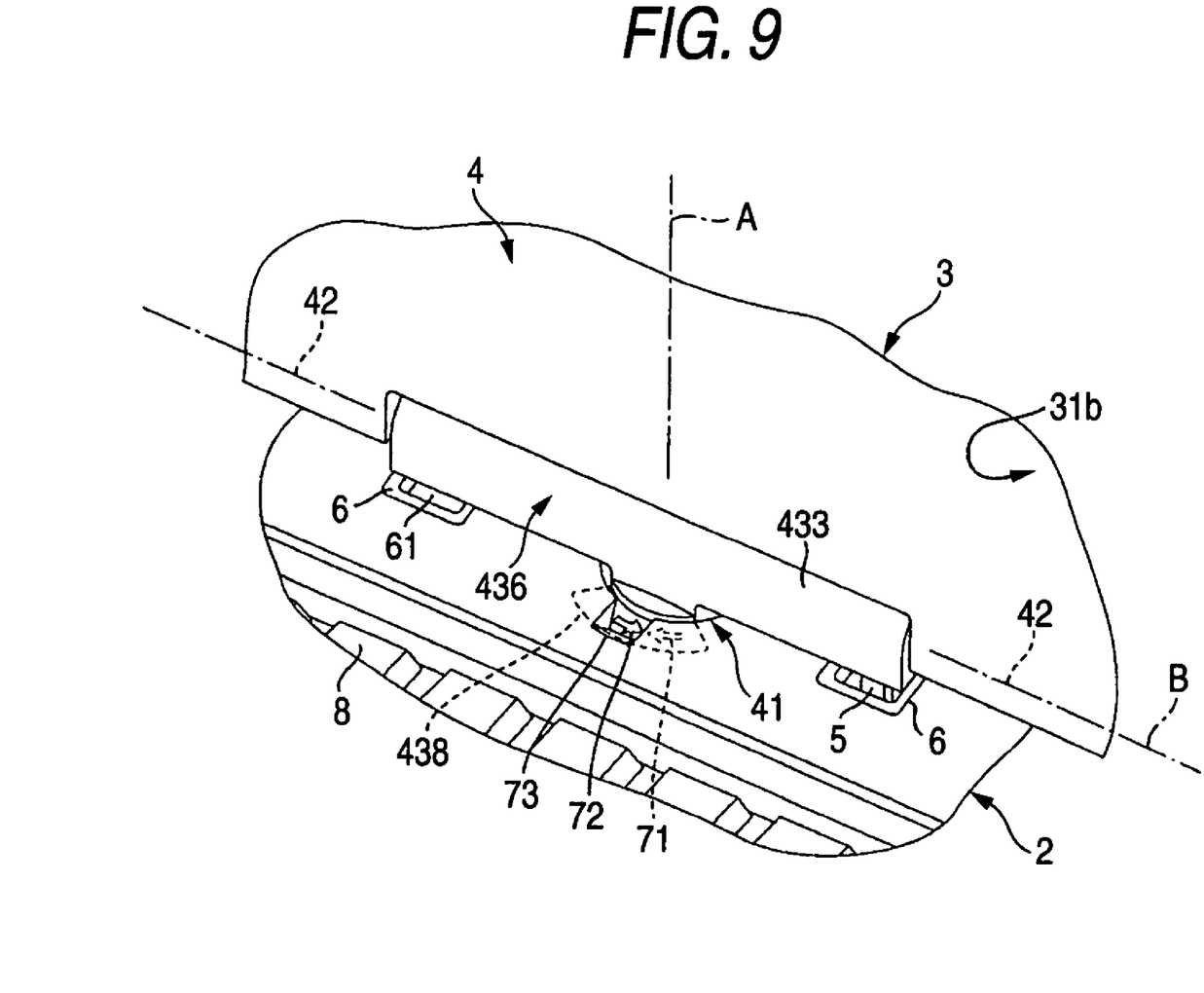
FIG. 9 is an exemplary perspective view, from the keyboard side, of the periphery of the hinge mechanism in a state in which the rear of the display panel of the electronic apparatus shown in FIG. 1 is opposed to the keyboard.

The first index 71 and the second index 72 are provided on each of the operation face side 435 and the non-operation face side 436 of the hinge cover 433, as shown in FIGS. 6 and 9. The first index 71 on the operation face side 435 and the first index 71 on the non-operation face side 436 are placed in the positional relationship out of the twice symmetrical position with the pivot shaft 41 as the center, namely, in the positional relationship out of the position of 180°. The second index 72 is placed in the twice symmetrical positional relationship with the first index 71 with the pivot shaft 41 as the center, namely, in the positional relationship of 180°.

Figure 10:
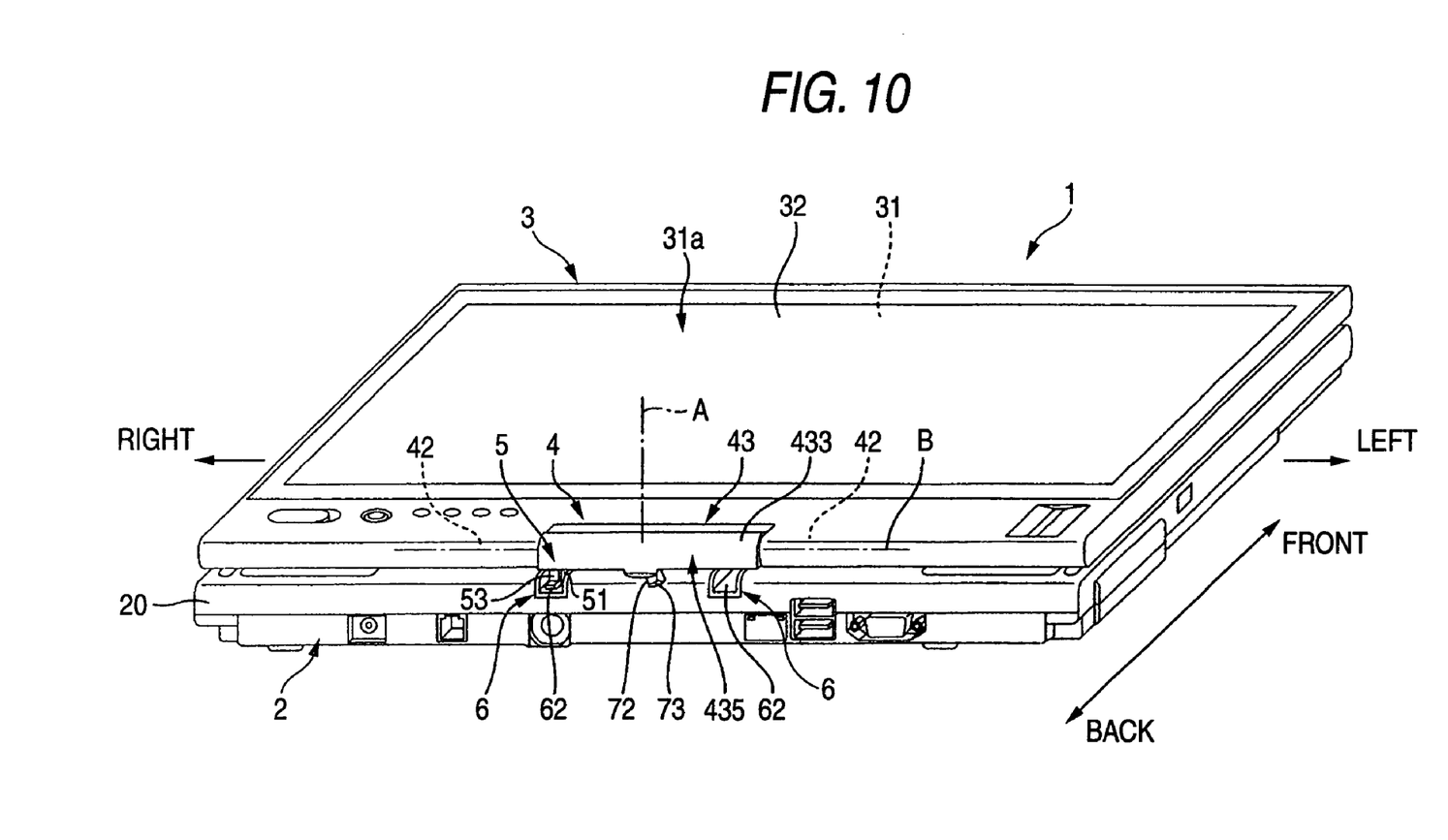
FIG. 10 is an exemplary perspective view of a state in which the display panel of the electronic apparatus shown in FIG. 1 is put on the main body with the display surface turned up relative to the main body from the rear thereof.

The housing 20 and the cover 21 cover the skirt parts 437 and 438 of the hinge cover 433 and have a display window 73 for allowing the user to see the first index 71 and the second index 72. The display window 73 allows the user to see the first index 71 in a state in which the display surface 31a is opposed to the keyboard 8 as shown in FIG. 6, and allows the user to see the second index 72 in a state in which the rear 31b is opposed to the keyboard 8 as shown in FIG. 9. The display window 73 is placed in the positional relationship out of 180° like the positional relationship in which the first indexes 71 and the second indexes 72 are placed so that the user can see the first index 71 or the second index 72 if the user views the main body 2 from the back, as shown in FIGS. 3 and 10.

The electronic apparatus 1 described above enables the user performing entry operation from the keyboard 8 to visually check the state in which the engagement part of the pivot support member 43 is fitted into the reception part 6 when the user turns the display panel 3 from the state shown in FIG. 6 to the state shown in FIG. 9 or from the state shown in FIG. 9 to the state shown in FIG. 6. Therefore, the user can intuitively determine the direction in which the display panel 3 can be rotated from the visibly seen structural feature, so that the user can smoothly turn the display panel 3 without straining the pivot shaft 41. Further, the electronic apparatus 1 of the embodiment includes the display window 73 for displaying the direction in which the display panel 3 can be rotated by an arrow, thus enabling the user to easily understand the direction of rotating the display panel 3.

If the user rotates the display panel 3 in an erroneous direction, the engagement part 5 and the reception part 6 abut each other at a sufficiently distant position in the radial direction from the outer diameter of the pivot shaft 41 relative to the axis A of the pivot shaft 41, so that applying the rotation torque directly to the pivot shaft 41 is eliminated. This means that the mechanism provided between the base plate 411 and the body part 431 of the pivot support member 43 for limiting the rotation range of the pivot shaft 41 is prevented from receiving an allowable load. The mechanism provided on the pivot shaft 41 for limiting the rotation range of the pivot shaft 41 can also be omitted because it is replaced with the engagement part 5 and the reception part 6.

In the embodiment described above, the engagement part 5 is projected from the pivot support member 43 and the reception part 6 is recessed in the main body 2. The relationship between the engagement part 5 and the reception part 6 is not limited to the mode. For example, the engagement part 5 is recessed between the pivot shaft 41 and the rotation shaft 42 or in the margin of the display panel 3 on the extension of the rotation shaft 42 at a distance from the rotation shaft 42 relative to the pivot shaft 41, and the reception part 6 is projected on the main body 2 at the position corresponding to the engagement part 5. In the mode in which the engagement part 5 is recessed and the reception part 6 is projected, the correspondence number between the engagement part 5 and the reception part 6 is not limited to that in the embodiment described above. For example, one engagement part 5 is provided at left-right symmetrical positions with the pivot shaft 41 as the center for one projected reception part 6 (two engagement parts 5 in total).

The support mechanism may be provided between the display panel 3 and the main body 2 at the symmetrical position with the engagement part 5 with the pivot shaft 41 as the center instead of providing the projection 521, 531 provided on the leg part 52, 53 of the engagement part 5. The display panel 3 can be prevented from being inclined in an opposite direction to the engagement part 5 with the pivot shaft 41 as the center by providing the support mechanism even if the projections 521 and 531 are not provided.

As described with reference to the embodiment, there is provided an electronic apparatus having a configuration for enabling the user to easily visually check the rotation direction of a hinge mechanism from the appearance. Accordingly the display panel can be turned smoothly.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the apparatus described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a main body that has an input unit placed on a top surface of the main body;
    a display panel that has a display surface and a rear surface on an opposite side to the display surface;
    a hinge mechanism that joins the display panel to the main body, the hinge mechanism having a pivot shaft, a rotation shaft, and a pivot support member;
    an engagement part that is provided on the pivot support member; and
    a reception part that receives the engagement part when the display surface faces the input unit or when the rear surface faces the input unit, the main body including the reception part, wherein the reception part is formed to be recessed in the main body, wherein
    the pivot shaft pivotably supports the display panel with an axis rising from the top surface of the main body,
    the rotation shaft rotatably supports the display panel to be openable about an axis provided along one side of the display panel,
    the pivot support member supports the pivot shaft and the rotation shaft in a state in which the pivot shaft and the rotation shaft intersect with one another, the pivot support member being pivotable about the pivot shaft and includes a body part formed like a tube along the axis of the pivot shaft, an arm part extending along the axis of the rotation shaft from the body part, and a hinge cover for covering an upper opening of the body part and the arm part, and
    the engagement part extends from the hinge cover to the main body.

2. The electronic apparatus according to claim 1, wherein the engagement part is projected from the pivot support member in a direction along the axis of the pivot shaft, and wherein the reception part is formed to be recessed in the top surface of the main body.

3. The electronic apparatus according to claim 2, wherein the reception part has a terminal provided on an interface of the reception part to be exposed, and wherein the engagement part is electrically connected to the terminal in a state in which the engagement part enters the reception part.

4. The electronic apparatus according to claim 2, wherein the engagement part has a projected portion projected in a pivoting direction of the pivot support member, and wherein the reception part has a fit recess into which the projection is fitted.

* * * * *